United States Patent
Tsubouchi et al.

(10) Patent No.: US 9,716,325 B1
(45) Date of Patent: Jul. 25, 2017

(54) ELECTRONIC COMPONENT UNIT AND ELECTRICAL CONNECTION BOX

(71) Applicant: Yazaki Corporation, Tokyo (JP)

(72) Inventors: Tatsuya Tsubouchi, Shizuoka (JP); Takahiko Mitsui, Shizuoka (JP); Yosuke Fukuhara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/413,630

(22) Filed: Jan. 24, 2017

(30) Foreign Application Priority Data

Jan. 26, 2016 (JP) ................................. 2016-012150

(51) Int. Cl.
*H01R 11/09* (2006.01)
*H01R 9/24* (2006.01)

(52) U.S. Cl.
CPC .......... *H01R 9/2466* (2013.01); *H01R 9/245* (2013.01); *H01R 9/2433* (2013.01)

(58) Field of Classification Search
CPC ... H01R 31/00; H01R 9/2458; H01R 13/6658
USPC .......................... 439/621, 622, 949, 76.2, 723
See application file for complete search history.

(56) References Cited

U.S. PATENT DOCUMENTS

| | | | |
|---|---|---|---|
| 5,767,761 A * | 6/1998 | Muramatsu | H01H 85/2035 337/186 |
| 6,146,206 A * | 11/2000 | Konno | H01R 13/68 439/620.26 |
| 6,162,097 A * | 12/2000 | Liang | H01H 85/202 439/218 |
| 6,190,207 B1 * | 2/2001 | Wang | H01R 13/52 439/620.31 |
| 6,418,005 B1 * | 7/2002 | Endo | H01H 39/00 337/168 |
| 6,830,481 B1 * | 12/2004 | Umeshita | H01H 85/2035 439/620.27 |

FOREIGN PATENT DOCUMENTS

JP 2011-155762 A 8/2011

\* cited by examiner

*Primary Examiner* — Phuongchi T Nguyen
(74) *Attorney, Agent, or Firm* — Kenealy Vaidya LLP

(57) ABSTRACT

An electronic component unit includes an accommodation member, electronic components, and a bus bar including a rectangular unit. The accommodation member accommodates the electronic components and the bus bar in an accommodation space portion of an inner space portion. The accommodation member has a dividing wall that forms divided space portions by dividing the accommodation space portion. The dividing wall is provided with a slit that communicates the adjacent divided space portions. The rectangular unit of the bus bar is exposed to the inside of each of the divided space portions, when the rectangular unit is held by being inserted into the slit. The electronic components that are individually accommodated in the respective divided space portions are connected to the rectangular unit being exposed.

2 Claims, 5 Drawing Sheets

ELECTRONIC COMPONENT UNIT AND ELECTRICAL CONNECTION BOX

CROSS-REFERENCE TO RELATED APPLICATION(S)

The present application claims priority to and incorporates by reference the entire contents of Japanese Patent Application No. 2016-012150 filed in Japan on Jan. 26, 2016.

BACKGROUND OF THE INVENTION

1. Field of the Invention

The present invention relates to an electronic component unit and an electrical connection box.

2. Description of the Related Art

Conventionally, an electrical connection box that is mounted on a vehicle such as an automobile, and that distributes power from a power source such as a battery to electronic instruments has been known. A known electrical connection box such as the above is an electrical connection box that includes an electronic component unit provided with a bus bar on which electronic components such as a fusible link, a fuse, and a relay are mounted, and an accommodation member that accommodates therein the bus bar; and a housing that accommodates therein the electronic component unit (see Japanese Patent Application Laid-open No. 2011-155762).

The electronic component unit described above includes a plurality of electronic components, and there are times when all the electronic components are to be electrically connected to a single electrical connection unit such as a power terminal from a power source, for example. In this case, the bus bar includes a tab unit for each of the electronic components, and a single connection unit connected to the tab units. More specifically, each of the tab units of the bus bar is formed in a rectangular shape, and an end of each of the tab units in the insertion direction of the electronic component is coupled to a connection unit formed in a strip shape. The inner space portion of the accommodation member is divided by dividing walls, forming divided space portions (cavities). When the bus bar is accommodated in the accommodation member, each of the tab units is positioned inside each of the divided space portions. The electronic component that is accommodated in the divided space portion is mounted on each of the tab units inside each of the divided space portions, and each of the tab units and the electronic component are electrically connected inside each of the divided space portions.

Because the bus bar described above is configured of the tab units and the single connection unit, the external shape of the bus bar becomes complicated in shape. Consequently, there is room for further improvement.

SUMMARY OF THE INVENTION

The present invention has been made in view of the above, and an object of the present invention is to provide an electronic component unit and an electrical connection box that can electrically connect a bus bar and each of electronic components inside each of divided space portions, and that can simplify the external shape of the bus bar.

In order to achieve the above mentioned object, an electronic component unit according to one aspect of the present invention includes an accommodation member that includes a first opening and a second opening for communicating an accommodation space portion; a plurality of electronic components that are accommodated in the accommodation space portion by being inserted into the accommodation space portion from the second opening; and a bus bar in a planar shape that is accommodated in the accommodation space portion by being inserted into the accommodation space portion from the first opening, and that includes a rectangular unit, wherein the accommodation member includes a dividing wall that couples inner wall surfaces facing each other in a peripheral wall for forming the accommodation space portion, in the accommodation space portion, and that forms divided space portions by dividing the accommodation space portion, the dividing wall is provided with a slit that extends from an end of the first opening side toward the second opening, and that communicates the adjacent divided space portions, the rectangular unit of the bus bar is exposed to inside of each of the divided space portions, when the rectangular unit is held by being inserted into the slit, and the electronic components are individually accommodated in the respective divided space portions, and are connected to the rectangular unit being exposed.

In order to achieve the above mentioned object, an electrical connection box according to another aspect of the present invention includes a housing; and an electronic component unit that is accommodated in a housing inner space portion of the housing, wherein the electronic component unit includes an accommodation member having a first opening and a second opening that communicate an accommodation space portion of the electronic component unit, a plurality of electronic components that are accommodated in the accommodation space portion by being inserted into the accommodation space portion from the second opening, and a bus bar in a planar shape that is accommodated in the accommodation space portion by being inserted into the accommodation space portion from the first opening, and that includes a rectangular unit, the accommodation member includes a dividing wall that couples inner wall surfaces facing each other in a peripheral wall for forming the accommodation space portion, in the accommodation space portion, and that forms divided space portions by dividing the accommodation space portion, the dividing wall is provided with a slit that extends from an end of the first opening side toward the second opening, and that communicates the adjacent divided space portions, the rectangular unit of the bus bar is exposed to inside of each of the divided space portions, when the rectangular unit is held by being inserted into the slit, and the electronic components are individually accommodated in the respective divided space portions, and are connected to the rectangular unit being exposed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of an electronic component unit and an electrical connection box according to the present invention will now be described in detail with reference to the accompanying drawings. It is to be understood that the present invention is not limited to the embodiments. In addition, components in the following embodiments include those that can be easily assumed by a person skilled in the art, or those that are substantially the same. Furthermore, various omissions, replacements, and modifications may be made to the components in the following embodiments without departing from the scope and spirit of the invention.

First Embodiment

Figure 1:
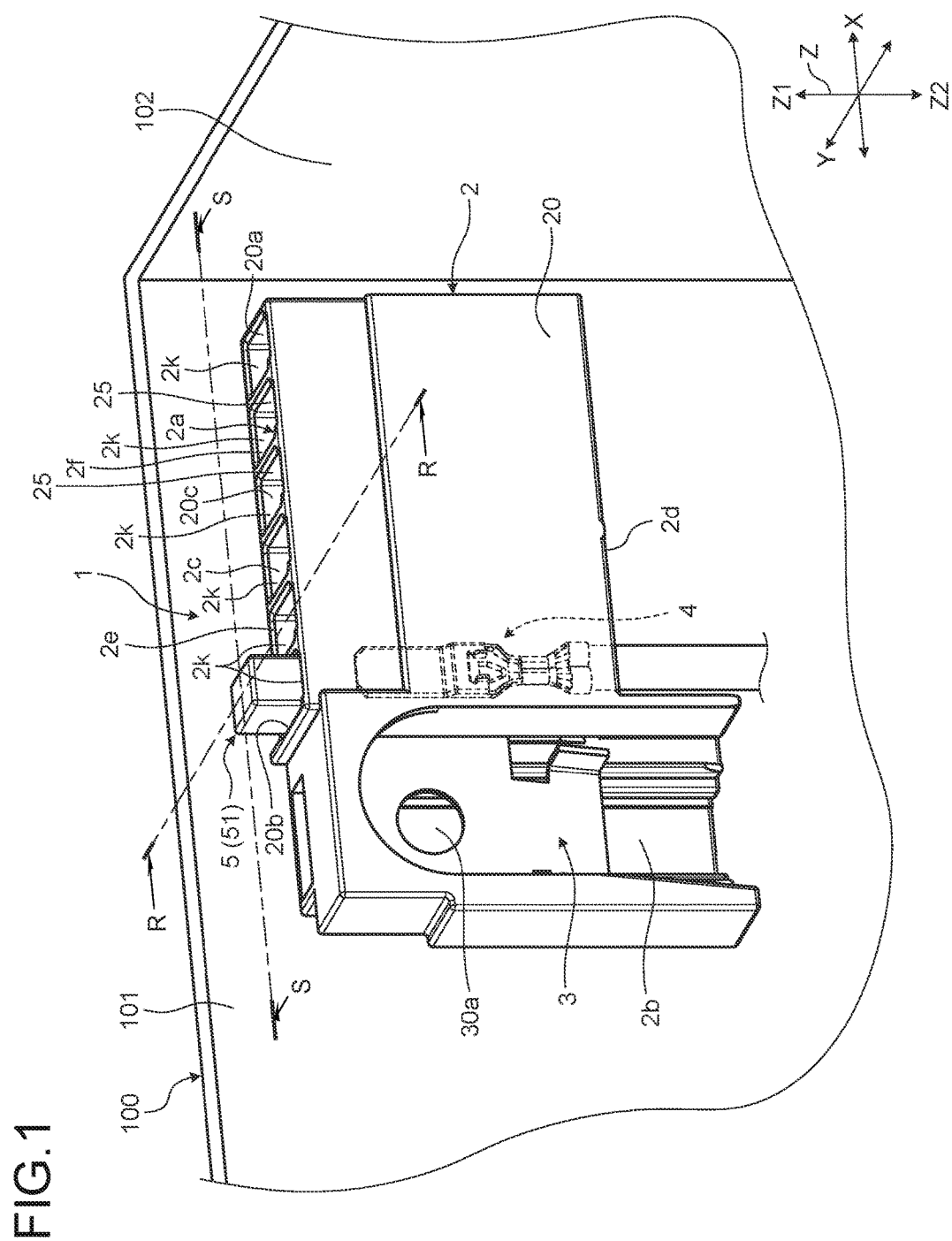
FIG. 1 is a partial perspective view illustrating a schematic configuration of an electronic component unit and an electrical connection box according to a first embodiment.
Figure 2:
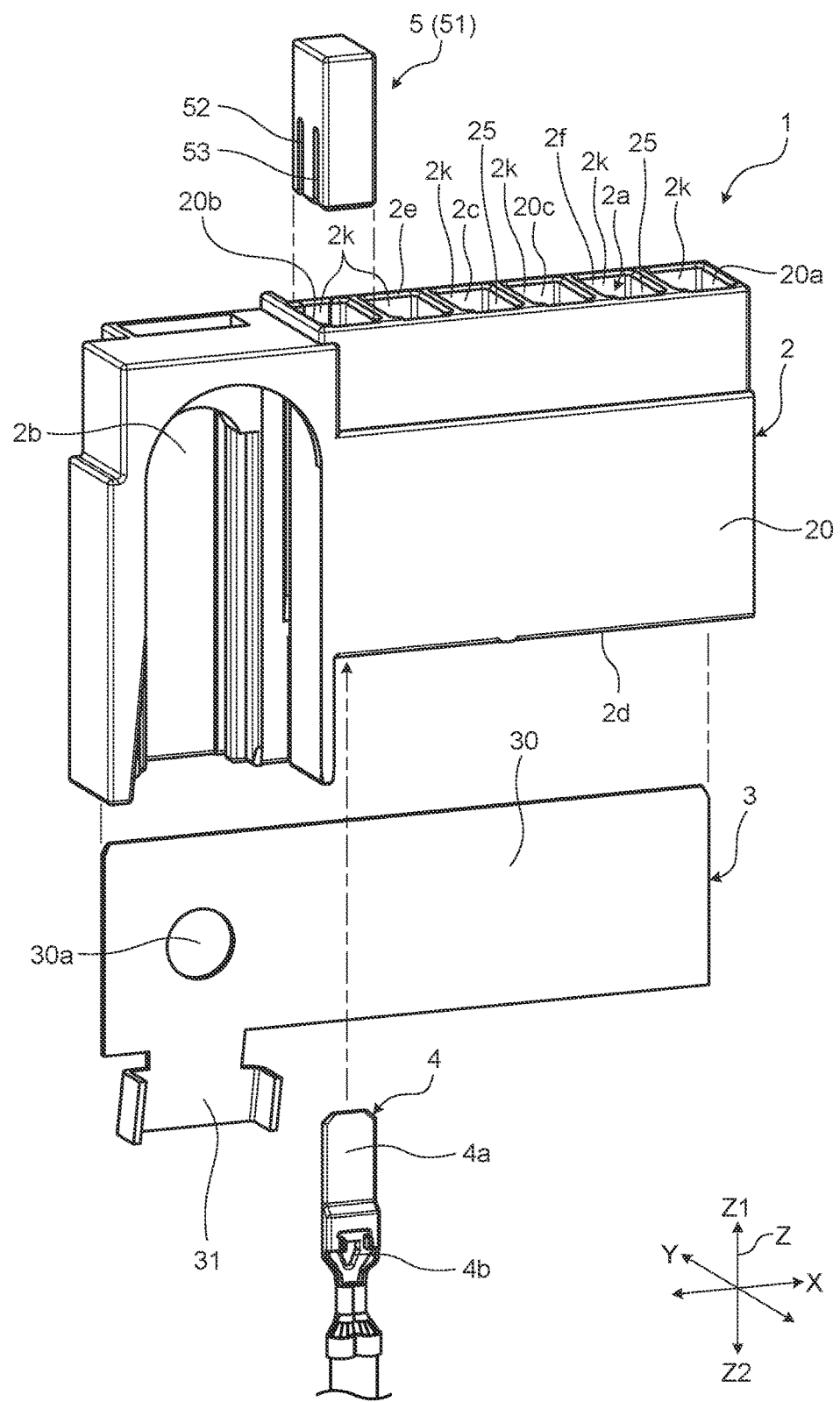
FIG. 2 is an exploded perspective view of the electronic component unit according to the first embodiment.
Figure 3:
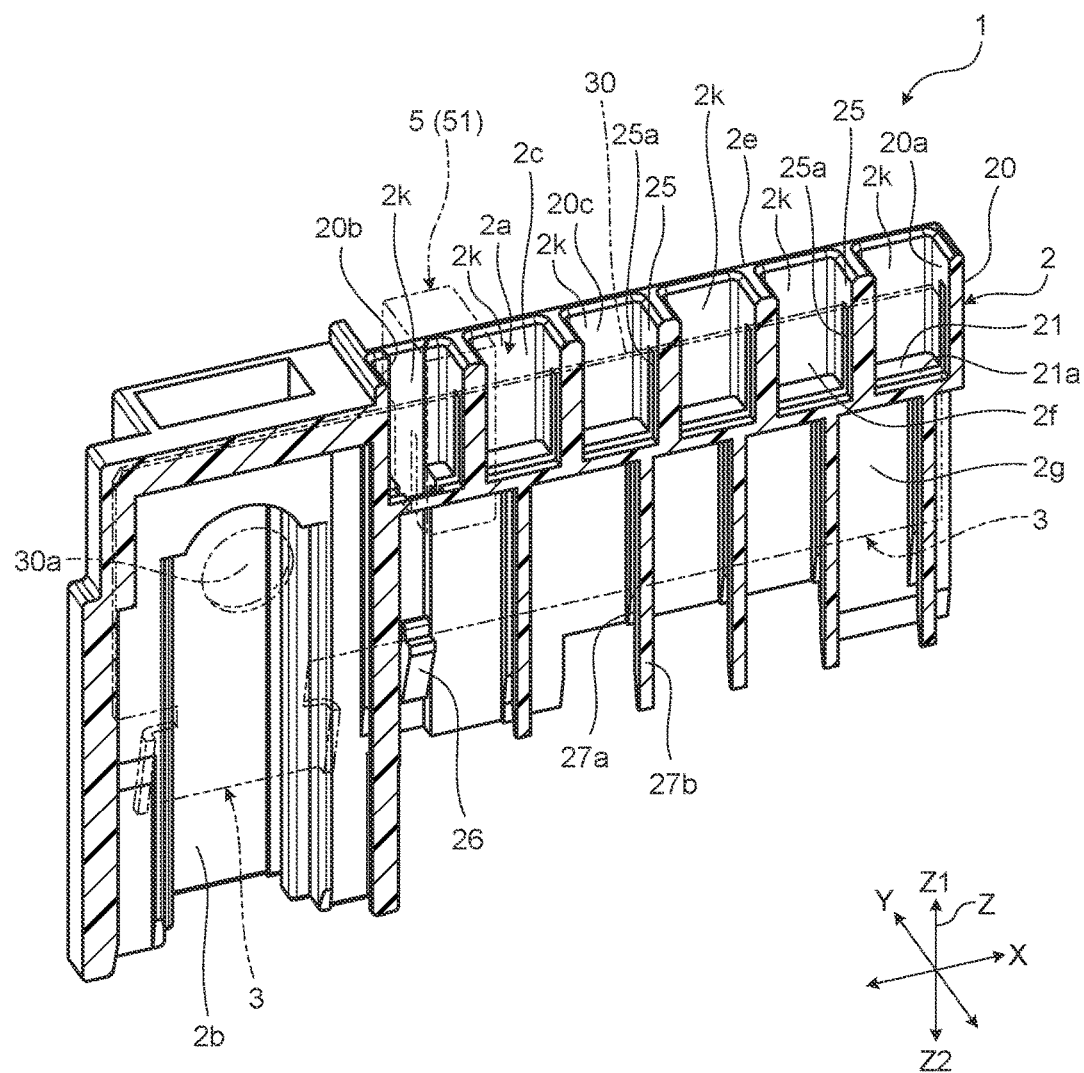
FIG. 3 is a sectional view of the electronic component unit according to the first embodiment.
Figure 4:
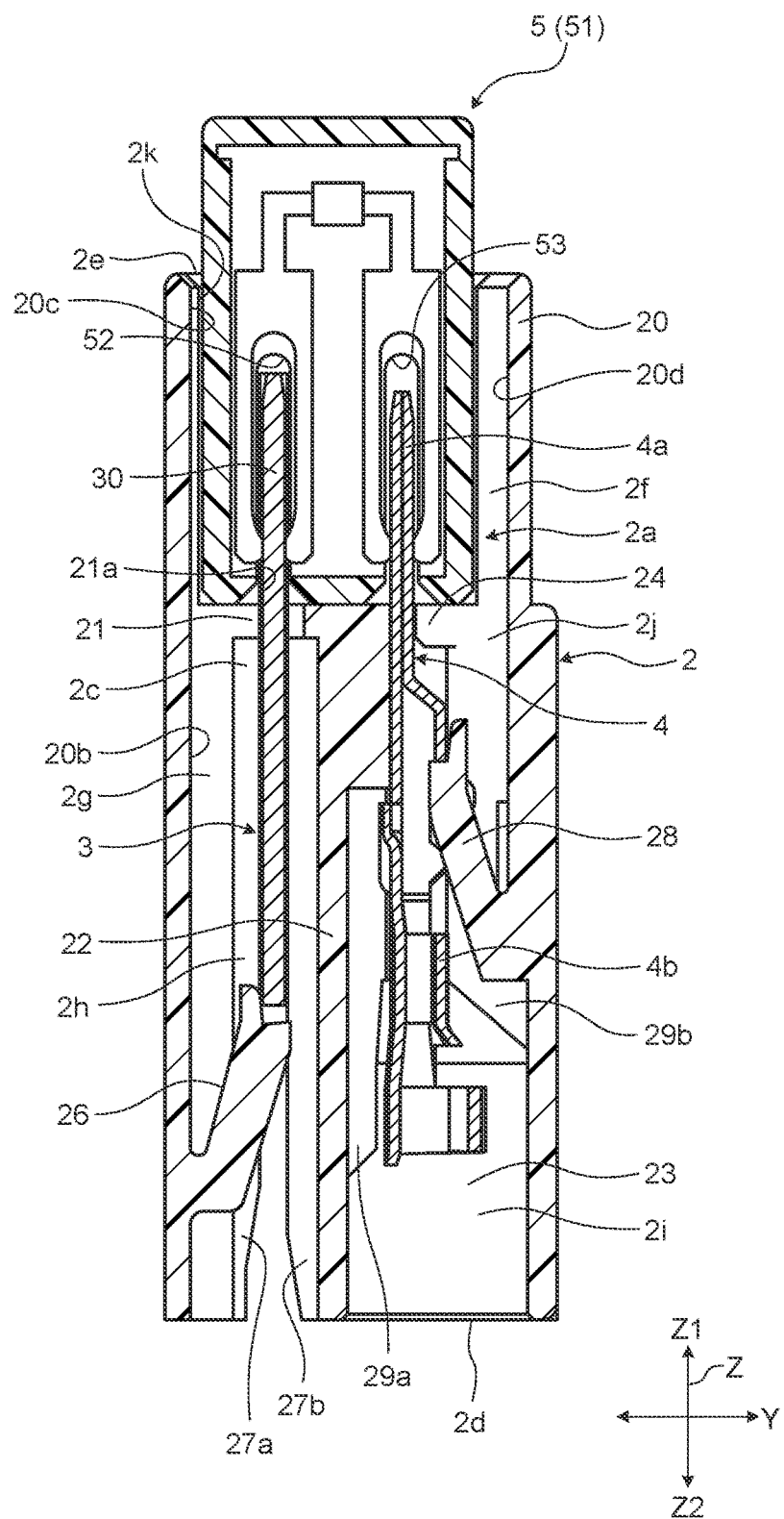
FIG. 4 is a sectional view of the electronic component unit according to the first embodiment.

An electronic component unit and an electrical connection box according to a first embodiment will now be described. FIG. 1 is a partial perspective view illustrating a schematic configuration of the electronic component unit and the electrical connection box according to the first embodiment. FIG. 2 is an exploded perspective view of the electronic component unit according to the first embodiment. FIG. 3 is a sectional view of the electronic component unit according to the first embodiment. FIG. 4 is a sectional view of the electronic component unit according to the first embodiment. In this example, FIG. 3 is a sectional view cut along a line S-S in FIG. 1, and FIG. 4 is a sectional view cut along a line R-R in FIG. 1. The X direction in the drawings is the longitudinal direction of the electronic component unit in the present embodiment. The Y direction is the width direction of the electronic component unit in the present embodiment, and is a direction orthogonal to the longitudinal direction. The Z direction is the vertical direction of the electronic component unit in the present embodiment, and is a direction orthogonal to the width direction as well as the longitudinal direction. The Z1 direction is the upward direction. The Z2 direction is the downward direction.

An electrical connection box 100 includes a housing 101 and a housing inner space portion 102 that is formed by the housing 101. As illustrated in FIG. 1, the electrical connection box 100 accommodates at least a single electronic component unit 1 in the housing inner space portion 102. The electrical connection box 100 integrates and accommodates therein electrical components such as a terminal metal fitting, a relay, and resistance that are incorporated into a wire harness, which is not illustrated, routed in an automobile, and that form a connection processing part such as an electric wire. The electrical connection box 100 distributes power supplied from a power source such as a battery, to various electronic instruments in the vehicle. The electrical connection box 100 may also be referred to as a junction box, a fuse box, a relay box, and the like, but in the present embodiment, these are collectively referred to as the electrical connection box.

The electronic component unit 1 in the present embodiment configures a part of a power distribution circuit that distributes power supplied from a power source, which is not illustrated, to various electronic instruments in the vehicle.

The electronic component unit 1 includes an accommodation member 2, a bus bar 3, a plurality of terminals 4, and a plurality of electronic components 5.

The accommodation member 2 is a member that accommodates therein the bus bar 3, the terminals 4, and the electronic components 5. The accommodation member 2 facilitates the handling of the bus bar 3, the terminals 4, and the electronic components 5, by installing therein the bus bar 3, the terminals 4, and the electronic components 5 2 in advance, before being accommodated in the electrical connection box 100. For example, the accommodation member 2 is made of synthetic resin, and as illustrated in FIG. 1 and FIG. 4, includes an inner space portion 2a, a peripheral wall 20, a positioning bottom plate 21, a partitioning plate 22, a terminal partitioning plate 23, a protrusion portion 24, and a dividing wall 25.

The inner space portion 2a includes a power source space portion 2b and an accommodation space portion 2c. The peripheral wall 20 forms the accommodation space portion 2c. The peripheral wall 20 is formed of a plurality of walls, and the walls are connected with each other, thereby forming a tube in a substantially square shape. The accommodation member 2 is communicated with the outside through both ends of the accommodation space portion 2c in the vertical direction, by the peripheral wall 20. The accommodation member 2 includes a lower side opening (first opening) 2d that is an opening formed at the lower side, and an upper side opening (second opening) 2e that is an opening formed at the upper side. In the peripheral wall 20, a slit is formed on a boundary wall between the power source space portion 2b and the accommodation space portion 2c, and the power source space portion 2b and the accommodation space portion 2c are communicated via the slit. The accommodation space portion 2c is provided with the positioning bottom plate 21, the partitioning plate 22, the terminal partitioning plate 23, the protrusion portion 24, and the dividing wall 25.

As illustrated in FIG. 3 and FIG. 4, the positioning bottom plate 21 determines the position of each of the electronic components 5 in the vertical direction (Z direction), by coming into contact with the lower side end of the electronic component 5 that is accommodated in the accommodation space portion 2c. The positioning bottom plate 21 is formed in a planar shape, and both ends of the positioning bottom plate 21 in the longitudinal direction (X direction) are coupled to an inner wall surface 20a and an inner wall surface 20b that are facing each other in the longitudinal direction of the peripheral wall 20. The end of the positioning bottom plate 21 at an inner wall surface 20c side (bus bar 3 side) in the width direction (Y direction) is coupled to the inner wall surface 20c, and the end of the positioning bottom plate 21 at an inner wall surface 20d side (terminal 4 side) is separated from the inner wall surface 20d. The width of the positioning bottom plate 21 in the width direction is formed so that the terminal 4 can penetrate through the end at the terminal 4 side and the inner wall surface 20d. As illustrated in FIG. 1 and FIG. 4, the positioning bottom plate 21 is formed so that when the electronic component 5 is accommodated in the accommodation space portion 2c, the upper side end surface of the electronic component 5 protrudes from the upper side opening 2e, in the vertical direction. In this example, the accommodation space portion 2c is divided into an upper side space portion 2f and a lower side space portion 2g by the positioning bottom plate 21, the positioning bottom plate 21 being the boundary. As illustrated in FIG. 3 and FIG. 4, a slit 21a is formed on the positioning bottom plate 21. The slit 21a penetrates through the positioning bottom plate 21 in the vertical direction, and the upper side space portion 2f and the lower side space portion 2g are communicated via the slit 21a. The slit 21a is formed across the entire longitudinal direction, from the inner wall surface 20a to the inner wall surface 20b. The width of the slit 21a in the width direction is formed so that a rectangular unit 30, which will be described below, of the bus bar 3 can penetrate through the slit 21a, when the bus bar 3 is inserted into the accommodation space portion 2c.

As illustrated in FIG. 4, the partitioning plate 22 is provided in the lower side space portion 2g. The partitioning plate 22 divides the lower side space portion 2g into a bus bar side space portion 2h into which the bus bar 3 is to be inserted, and a terminal side space portion 2i into which the terminal 4 is to be inserted, in the width direction. The partitioning plate 22 is formed in a planar shape, and both ends of the partitioning plate 22 in the longitudinal direction are coupled to the inner wall surface 20a and the inner wall surface 20b. The partitioning plate 22 extends downward from the end of the positioning bottom plate 21 at the terminal 4 side to the lower side opening 2d. In other words, when viewed from the width direction, an inverted L-shaped plate (wall) that protrudes from the inner wall surface 20c is formed across the entire longitudinal direction of the accommodation space portion 2c, by the positioning bottom plate 21 and the partitioning plate 22. Consequently, the bus bar side space portion 2h and the upper side space portion 2f are divided by the positioning bottom plate 21, but the terminal side space portion 2i and the upper side space portion 2f are not divided.

As illustrated in FIG. 4, the terminal partitioning plate 23 is provided in the terminal side space portion 2i. A plurality of the terminal partitioning plates 23 are formed in the longitudinal direction. The terminal partitioning plates 23 divide the terminal side space portion 2i in the longitudinal direction, and form a plurality of terminal side divided space portions 2j. Each of the terminal side divided space portions 2j in the present embodiment is formed at regular intervals in the longitudinal direction, and accommodates therein the terminal 4 individually. The terminal partitioning plate 23 is in a planar shape, and is coupled to the partitioning plate 22 and the inner wall surface 20d in the width direction. The terminal partitioning plate 23 extends downward from the upper side end of the partitioning plate 22 to the lower side opening 2d, in the vertical direction.

As illustrated in FIG. 4, the protrusion portion 24 is provided in each of the terminal side divided space portions 2j. The protrusion portion 24 determines the position of the electronic component 5 in the vertical direction, with the positioning bottom plate 21, by coming into contact with the lower side end of the electronic component 5 that is to be accommodated in the accommodation space portion 2c. At the upper side end of the terminal partitioning plate 23, when viewed from the vertical direction, the protrusion portion 24 protrudes into the terminal side divided space portion 2j. The protrusion portion 24 of the present embodiment is also coupled to the inner wall surface 20d. The protrusion portion 24 protrudes into each of the adjacent terminal side divided space portions 2j, from the terminal partitioning plate 23. In other words, two protrusion portions 24 that are facing each other in the longitudinal direction, are formed in the single terminal side divided space portion 2j. The width of the protrusion portion 24 in the width direction is formed so that the terminal 4 can penetrate through the end of the protrusion portion 24 at the bus bar 3 side and the partitioning plate 22.

As illustrated in FIG. 2 and FIG. 3, the dividing wall 25 is provided in the upper side space portion 2f. A plurality of the dividing walls 25 are formed in the longitudinal direction, depending on the number of electronic components 5 to be accommodated in the accommodation space portion 2c. The dividing walls 25 divide the upper side space portion 2f in the longitudinal direction, and form divided space portions 2k. Each of the dividing walls 25 in the present embodiment is formed at regular intervals in the longitudinal direction, and the electronic components 5 are individually accommodated in the respective divided space portions 2k. Each of the dividing walls 25 is formed in a planar shape, and is coupled to the inner wall surface 20c and the inner wall surface 20d that are facing each other in the longitudinal direction of the peripheral wall 20, in the width direction. The dividing wall 25 protrudes upward from the positioning bottom plate 21 and the upper side end surface of the terminal partitioning plate 23 in the vertical direction, and extends to the upper side opening 2e. In other words, the dividing wall 25 continues to the terminal partitioning plate 23 in the vertical direction, and forms a single plate with the terminal partitioning plate 23.

A slit 25a is formed on the dividing wall 25. The rectangular unit 30 of the bus bar 3 is to be inserted into the slit 25a. The slit 25a is formed upward from the lower side end of the dividing wall 25, in the vertical direction. The slit 25a penetrates through the dividing wall 25 in the longitudinal direction, and the adjacent divided space portions 2k are communicated via the slit 25a. The slit 25a faces the positioning bottom plate 21 in the width direction, and is communicated with the slit 21a. The upper side end of the slit 25a is formed at a position lower than the upper side end of the dividing wall 25, to restrict the movement of the bus bar 3 in the upward direction, when the bus bar 3 is inserted into the accommodation space portion 2c.

In this example, the bus bar side space portion 2h includes a bus bar holding unit 26 and bus bar restricting units 27a and 27b. As illustrated in FIG. 3 and FIG. 4, the bus bar holding unit 26 protrudes from the inner wall surface 20c to the bus bar side space portion 2h. When the bus bar 3 is accommodated in the bus bar side space portion 2h, the bus bar holding unit 26 comes into contact with the lower side end of the rectangular unit 30 of the bus bar 3, and restricts the movement of the bus bar 3 in the vertical direction, with the slit 25a. Consequently, the bus bar holding unit 26 holds the bus bar 3, while the rectangular unit 30 of the bus bar 3 is inserted into the slit 25a. The bus bar holding unit 26 protrudes so as to separate from the inner wall surface 20c, from the lower side to the upper side in the vertical direction, and is elastically deformable. The bus bar restricting units 27a and 27b face each other in the width direction, and are formed at regular intervals in the longitudinal direction. When the bus bar 3 is inserted between the bus bar restricting units 27a and 27b, the bus bar restricting units 27a and 27b restrict the movement of the bus bar 3 in the width direction. The bus bar restricting unit 27a is formed on the wall facing the inner wall surface 20c, and extends downward from the lower side end surface of the positioning bottom plate 21 to the lower side opening 2d. The bus bar restricting unit 27b is formed on the partitioning plate 22, and extends downward from the lower side end surface of the positioning bottom plate 21 to the lower side opening 2d. An inclined surface for allowing the bus bar 3 to be inserted easily, is formed on each of the lower side ends of the bus bar restricting units 27a and 27b. Thus, the end-to-end distance of the inclined surface in the width direction increases toward the lower side.

A terminal holding unit 28 and terminal restricting units 29a and 29b are provided in each of the terminal side divided space portions 2*j*. As illustrated in FIG. 4, the terminal holding unit 28 protrudes from the inner wall surface 20*d* to the terminal side divided space portion 2*j*. When the terminal 4 is accommodated in the terminal side divided space portion 2*j*, the terminal holding unit 28 is inserted into a recess portion of the terminal 4, and holds the terminal 4 by restricting the movement of the terminal 4 in the vertical direction, with the partitioning plate 22. The terminal holding unit 28 protrudes upward so as to separate from the inner wall surface 20*d*, from the lower side toward the upper side in the vertical direction. The terminal holding unit 28 is formed so as to be elastically deformable. The terminal restricting units 29*a* and 29*b* face each other in the width direction, and are formed at regular intervals in the longitudinal direction. When the terminal 4 is inserted between the terminal restricting units 29*a* and 29*b*, the terminal restricting units 29*a* and 29*b* restrict the movement of the terminal 4 in the width direction. The terminal restricting unit 29*a* is formed on the partitioning plate 22, and extends downward from the middle of the partitioning plate 22 to the lower side opening 2*d*. The terminal restricting unit 29*b* is formed on a wall corresponding to the inner wall surface 20*d*, and extends downward from the lower side end surface of the protrusion portion 24 to the lower side opening 2*d*. An inclined surface for allowing the terminal 4 to be inserted easily, is formed on each of the lower side ends of the terminal restricting units 29*a* and 29*b*. Thus, the end-to-end distance of the inclined surface in the width direction increases toward the lower side.

As illustrated in FIG. 2 and FIG. 3, the bus bar 3 is electrically connected to the electronic component 5. The bus bar 3 in the present embodiment distributes and supplies power that is supplied from the power source, which is not illustrated, to various electronic instruments mounted on a vehicle that are electrically connected to the bus bar 3, via the electronic components 5 and the terminals 4. The bus bar 3 includes the rectangular unit 30 and a power source side holding unit 31. The bus bar 3 is formed in a planar shape, and the rectangular unit 30 and the power source side holding unit 31 are integrally formed. When the bus bar 3 is accommodated in the inner space portion 2*a*, the rectangular unit 30 is accommodated in the power source space portion 2*b* and the accommodation space portion 2*c*, and the power source side holding unit 31 is accommodated in the power source space portion 2*b*. In addition, the rectangular unit 30 is inserted into the slit 25*a* via the slit 21*a*, and exposed to each of the divided space portions 2*k*. The rectangular unit 30 is formed so that the upper side end becomes narrower in the upward direction. The rectangular unit 30 functions as a tab unit in the bus bar 3, by being electrically connected to each of the electronic components 5 in each of the divided space portions 2*k*. A through hole 30*a* is formed on the rectangular unit 30 at a portion where the rectangular unit 30 is positioned in the power source space portion 2*b*. A stud bolt that is electrically connected to the power source, which is not illustrated, is to be inserted into the through hole 30*a*. The power source side holding unit 31 fixes the electric wire and the like that is connected to the stud bolt inserted into the through hole 30*a*.

As illustrated in FIG. 1, the terminal 4 is electrically connected to the electronic component 5. The terminal 4 is fitted to one of the ends of an electric wire, and is electrically connected to various electronic instruments that are mounted on the vehicle being electrically connected to the other end of the electric wire. The terminal 4 is accommodated in the accommodation space portion 2*c*, in other words, in each of the terminal side divided space portions 2*j*, while the electric wire is being fitted thereto. For example, the terminal 4 is made of metal, and includes a terminal tab unit 4*a* in a planar shape that is formed in a rectangular shape, and an electric wire crimping unit 4*b* in a tubular shape that is coupled to the terminal tab unit 4*a* in the wiring direction of the electric wire. The terminal tab unit 4*a* is electrically connected to a load side connection unit 53 by being inserted into the electronic component 5. The electric wire crimping unit 4*b* fixes the terminal 4 while the electric wire is electrically connected to the terminal 4, by crimping the electric wire disposed inside. The terminal tab unit 4*a* is formed so that the upper side end (tip end portion) becomes narrower in the upward direction.

The electronic component 5 electrically connects the bus bar 3 and the terminal 4, and in this example, the electronic component 5 is an element that exerts various functions. The electronic component 5 in the present embodiment is a female fusible link 51 that has a slit in the connection portion. The fusible link 51 is incorporated into a part of a power distribution circuit, and shuts off the power distribution circuit when an overcurrent flows. As illustrated in FIG. 4, the fusible link 51 includes a power source side connection unit 52 and the load side connection unit 53. The power source side connection unit 52 is connected to the bus bar 3 that functions as a terminal at the power source side such as a battery. The load side connection unit 53 is connected to the terminal 4 at the load side of various electronic instruments in the vehicle. The power source side connection unit 52 and the load side connection unit 53 are electrically connected via a conductive fusible element in a plate shape. For example, while a low-melting point metal chip is welded to a strip-shaped conductive unit the width of which is narrowed, the fusible element melts when an overcurrent flows through the fusible element, and shuts off the electrical connection between the power source side connection unit 52 and the load side connection unit 53. For example, the overcurrent that flows through the fusible element is current of a predetermined rated current or more, and the fusible element is melted when the current of the predetermined rated current or more flows through the fusible element. The connection units have various shapes depending on the terminals to be connected. In the present embodiment, because a fork terminal is to be disposed inside the fusible link 51, a slit is formed on each of the connection units. When the fusible link 51 is accommodated in the divided space portion 2*k*, the bus bar 3 is inserted into the power source side connection unit 52, and the terminal tab unit 4*a* is inserted into the load side connection unit 53.

Next, an assembly procedure of the electronic component unit 1 according to the present embodiment will be described. First, a worker inserts a stud bolt into the through hole 30*a* of the bus bar 3 and fixes the stud bolt. The worker then fixes the electric wire or the like that is connected to the stud bolt by the power source side holding unit 31. Consequently, the bus bar 3 is electrically connected to the power source. The worker then inserts the bus bar 3 upward from the lower side opening 2*d* toward the bus bar side space portion 2*h* of the accommodation member 2. During this process, a part of the rectangular unit 30 of the bus bar 3 is positioned inside the accommodation space portion 2*c*, and the power source side holding unit 31 is positioned in the power source space portion 2*b*. The worker inserts the bus bar 3 further upward. Consequently, the upper side end of the bus bar 3, in other words, the upper side end of the rectangular unit 30 is inserted into the slit 25*a* via the slit 21*a*, a part of the rectangular unit 30 is inserted into the slit 25*a*, and a part of the rectangular unit 30 is positioned between the adjacent slits 25a, in other words, in the divided space portion 2k. During this process, the bus bar 3 crosses over the bus bar holding unit 26 while elastically deforming the bus bar holding unit 26, and is positioned above the bus bar holding unit 26. Thus, the bus bar 3 is held against the accommodation member 2 while the rectangular unit 30 is exposed to the inside of the divided space portions 2k.

Next, the worker inserts each of the terminals 4 upward from the lower side opening 2d toward each of the terminal side divided space portions 2j of the accommodation member 2. The worker inserts each of the terminals 4 further upward. Consequently, the upper side end of the terminal 4, in other words, the terminal tab unit 4a is positioned in each of the divided space portions 2k, via the positioning bottom plate 21 and the inner wall surface 20d. During the process, the terminal tab unit 4a of the terminal 4 crosses over the terminal holding unit 28 while elastically deforming the terminal holding unit 28, and the terminal holding unit 28 is positioned in the recess portion. Thus, the terminal 4 is held against the accommodation member 2 while the terminal tab unit 4a is exposed to the inside of the divided space portion 2k.

Next, while the rectangular unit 30 and the terminal tab unit 4a are exposed to the inside of the divided space portions 2k, the worker inserts each of the fusible links 51, which are the electronic components 5, downward from the upper side opening 2e to each of the divided space portions 2k. During the process, the fusible link 51 is inserted downward, while the power source side connection unit 52 and the load side connection unit 53 are facing the bus bar 3 and the terminal tab unit 4a that are being exposed, in the vertical direction. The worker inserts each of the fusible links 51 further downward. Consequently, the rectangular unit 30 is inserted into the power source side connection unit 52, and the terminal tab unit 4a, in other words, the terminal 4 is inserted into the load side connection unit 53. The worker inserts each of the fusible links 51 further downward so that the lower side end of the fusible link 51 comes into contact with the positioning bottom plate 21 and the protrusion portion 24. Thus, the electronic component 5 is accommodated in the accommodation space portion 2c. The above procedure allows the power source such as the battery, the bus bar 3, the electronic component 5, the terminal 4, and the various electronic instruments to be electrically connected in the accommodation space portion 2c of the accommodation member 2, thereby configuring the electronic component unit 1. In the assembly procedure described above, the terminal 4 is accommodated in the accommodation member 2, after the bus bar 3 is accommodated in the accommodation member 2. However, the assembly procedure is not limited thereto and the terminal 4 may be accommodated in the accommodation member 2 before the bus bar 3.

As described above, the electronic component unit 1 according to the present embodiment provides the slit 25a into which the rectangular unit 30 of the bus bar 3 is to be inserted, on the dividing wall 25 that is interposed between the adjacent divided space portions 2k in the accommodation member 2. Thus, the bus bar 3 is held while the rectangular unit 30 is inserted into the slit 25a. Consequently, it is possible to allow the rectangular unit 30 to penetrate through the dividing wall 25, and expose the rectangular unit 30 to the inside of the divided space portions 2k that are adjacent to each other interposing the dividing wall 25 therebetween. Hence, it is possible to electrically connect each of the electronic components 5 that is to be accommodated in each of the divided space portions 2k, and a single rectangular unit 30 of the bus bar 3. In other words, compared with a bus bar having a shape in which each of the tab units is independently provided and the tab units are coupled to the connection unit, the single rectangular unit 30 of the bus bar 3 functions as the tab unit as well as the connection unit. Consequently, it is possible to form the external shape of the bus bar 3 into a single rectangular shape, and simplify the external shape. In this manner, it is possible to electrically connect the bus bar 3 and each of the electronic components 5 inside of each of the divided space portions 2k, and simplify the external shape of the bus bar 3.

By simplifying the external shape of the bus bar 3, the transfer shape of a mold for molding the bus bar 3 can also be simplified. Thus, it is possible to reduce manufacturing cost and maintenance cost of the mold. In addition, compared with the bus bar having the shape in which each of the tab units is independently provided and the tab units are coupled to the connection unit, the tab unit and the connection unit are integrally formed by the single rectangular unit 30. Thus, there is no need to have length for forming the tab unit in the vertical direction. Consequently, it is possible to reduce the length in the vertical direction. Furthermore, compared with the bus bar having the shape in which each of the tab units is independently provided and the tab units are coupled to the connection unit, the shape of the tab unit is not restricted. Thus, the shape of the tab unit need not depend on the size of the electronic component 5 that is to be accommodated in the divided space portion 2k, particularly, on the width of the electronic component 5 in the X direction. Consequently, even if the size of the accommodation member 2 is the same, and the widths of the electronic components 5 that are to be accommodated differ in the X direction (even if the number of divided space portions 2k to be formed in the accommodation member 2 is changed), it is possible to use the same bus bar 3. Hence, it is possible to improve the versatility of the bus bar 3, and reduce the manufacturing cost. In addition, in the bus bar 3, when focusing on a portion where the electronic component 5 is electrically connected (portion corresponding to the tab unit), compared with when the tab units are independently formed, the space between the adjacent portions corresponding to the tab units is filled. Consequently, it is possible to increase the volume of the bus bar 3. In this manner, even if the electronic component 5 generates heat when power is supplied to the electronic component 5, the bus bar 3 can move a larger amount of heat. In addition, it is possible to improve the heat dissipation of the moved heat in the bus bar 3. Furthermore, it is possible to improve the strength of the bus bar 3, because the tab units are formed into the single rectangular unit 30.

In the electrical connection box 100 according to the present embodiment, the rectangular unit 30 can be exposed to the inside of the adjacent divided space portions 2k interposing the dividing wall 25, by holding the bus bar 3 while the rectangular unit 30 is inserted into the slit 25a. Hence, it is possible to electrically connect the bus bar 3 and each of the electronic components 5 inside the divided space portions 2k, and simplify the external shape of the bus bar 3.

Second Embodiment

Figure 5:
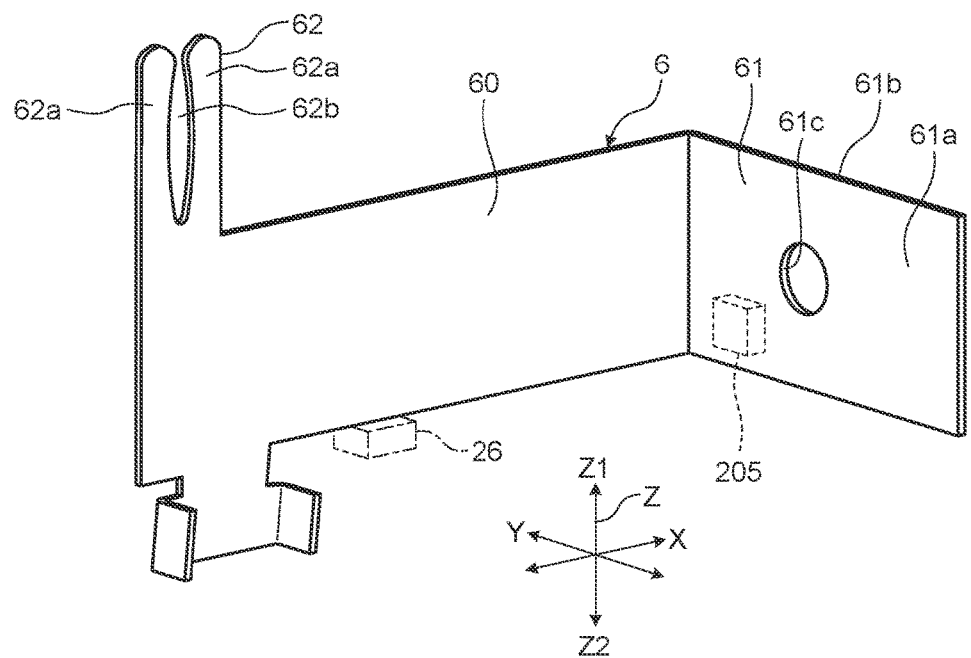
FIG. 5 is a perspective view of a bus bar according to a second embodiment.
Figure 6:
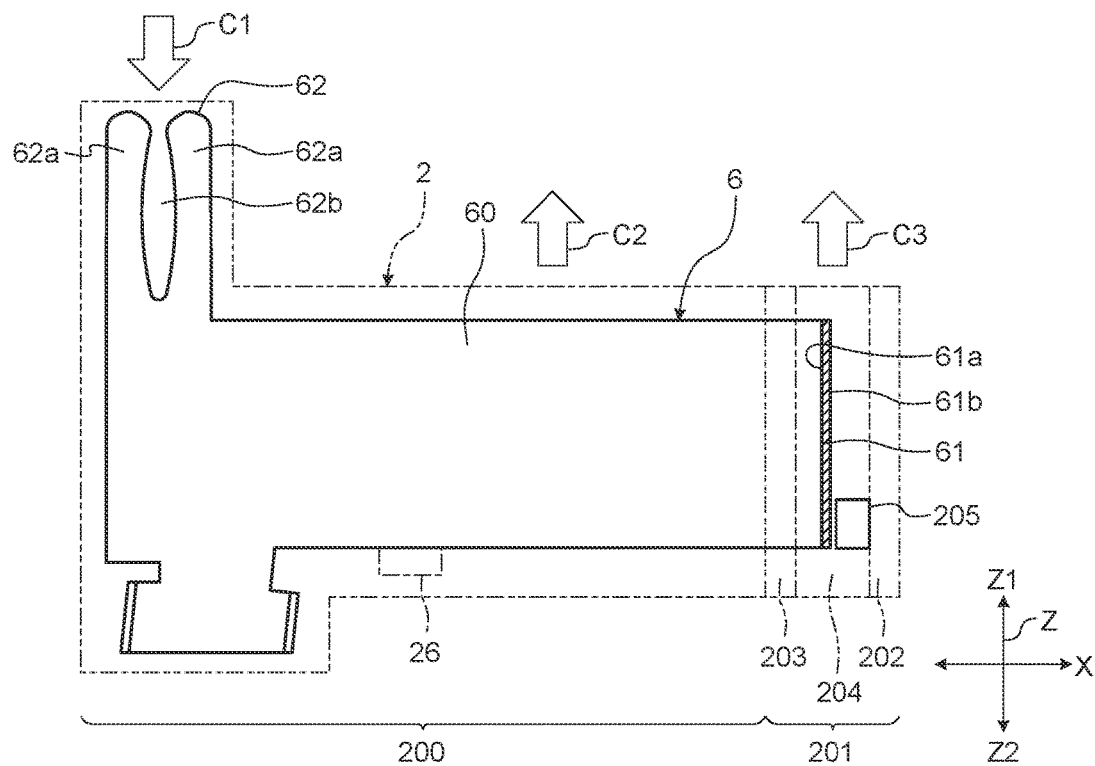
FIG. 6 is a schematic view of the bus bar according to the second embodiment.

Next, an electronic component unit and an electrical connection box according to a second embodiment will be described. FIG. 5 is a perspective view of a bus bar according to the second embodiment. FIG. 6 is a schematic view of the bus bar according to the second embodiment. The electronic component unit according to the second embodiment is different from the electronic component unit 1 according to the first embodiment in the shape of a bus bar 6. Overlapping description of the same configuration, actions, and effects as those in the first embodiment described above is omitted as much as possible.

The bus bar 6 is electrically connected to the electronic component 5 and an electronic component, which is not illustrated. As illustrated in FIG. 5 and FIG. 6, the bus bar 6 in the present embodiment is formed in a planar shape, and includes a first rectangular unit 60, a second rectangular unit 61, and a fork terminal unit 62.

The first rectangular unit 60 corresponds to the rectangular unit 30 in the first embodiment, and the end of the first rectangular unit 60 at the second rectangular unit 61 side in the longitudinal direction is coupled to the second rectangular unit 61. The upper end of the first rectangular unit 60 opposite to the second rectangular unit 61 side in the longitudinal direction is coupled to the fork terminal unit 62. In the bus bar 6 of the present embodiment, the first rectangular unit 60 and the second rectangular unit 61 may be orthogonal to each other or intersecting with each other, when viewed from the vertical direction.

The second rectangular unit 61 engages the bus bar 6 that is held against the accommodation member 2 by the bus bar holding unit 26. The end of the second rectangular unit 61 at the first rectangular unit 60 side in the width direction is coupled to the first rectangular unit 60. An engagement hole 61c that penetrates through a first wall surface 61a and a second wall surface 61b is formed on the second rectangular unit 61 in the middle of the width direction.

The fork terminal unit 62 electrically connects the bus bar 6 and the electronic component, which is not illustrated, by gripping the electronic component, which is not illustrated. The fork terminal unit 62 includes a pair of extension units 62a and a slit 62b. The pair of extension units 62a are separated in the longitudinal direction, and extend upward from the upper side end of the first rectangular unit 60. The slit 62b is a space between the pair of extension units 62a, and a portion into which the electronic component, which is not illustrated, is to be inserted.

The accommodation member 2 is a member that accommodates therein the bus bar 6, the terminal 4, the electronic component 5, and the electronic component, which is not illustrated. As illustrated in FIG. 6, the accommodation member 2 includes a main body unit 200 and an extension unit 201 (alternate long and two short dashes line in FIG. 6).

The accommodation space portion 2c in the first embodiment is formed in the main body unit 200, and the divided space portions 2k are formed in the main body unit 200 by the dividing wall 25. The main body unit 200 accommodates therein the first rectangular unit 60. The end of the main body unit 200 at the extension unit 201 side in the longitudinal direction, is coupled to the extension unit 201. In this example, in a holding state in which the bus bar 6 is held by the bus bar holding unit 26, a distance between the bus bar holding unit 26 and the upper side end of the slit 25a is set longer than the length of the first rectangular unit 60 in the vertical direction. In other words, in the holding state, when the first rectangular unit 60 comes into contact with the bus bar holding unit 26, in the bus bar 6, space is formed between the upper side end of the first rectangular unit 60 and the upper side end of the slit 25a.

The extension unit 201 accommodates therein a part of the bus bar 6, in other words, the second rectangular unit 61. The extension unit 201 includes a first wall 202, a second wall 203, an extension space portion 204, an engagement protrusion, which is not illustrated, and a movement restriction unit 205. The first wall 202 extends in the extending direction of the extension unit 201, in other words, the width direction. In an accommodated state in which the bus bar 6 is accommodated in the accommodation member 2, the first wall 202 faces the second wall surface 61b of the second rectangular unit 61 in the longitudinal direction. The second wall 203 extends in the width direction in parallel with the first wall 202. In the accommodated state, the second wall 203 faces the first wall surface 61a of the second rectangular unit 61 in the longitudinal direction. In this example, the extension space portion 204 is formed between the first wall 202 and the second wall 203.

When viewed from the width direction, the extension space portion 204 is longer than the thickness of the second rectangular unit 61, in other words, is formed at a wider interval. In the accommodated state, space is formed between the second rectangular unit 61 and the first wall 202 as well as between the second rectangular unit 61 and the second wall 203. For example, the engagement protrusion protrudes from the second wall 203 to the extension space portion 204, and is inserted into the engagement hole 61c. When the engagement protrusion is inserted into the engagement hole 61c, the bus bar 6 is prevented from falling off from the accommodation member 2. Even while the engagement protrusion is inserted into the engagement hole 61c, the bus bar 6 can move relative to the accommodation member 2 within a predetermined range. In the present embodiment, the first wall 202 and the second wall 203 are coupled at the ends opposite from the main body unit 200 side.

The movement restriction unit 205 restricts the movement of the bus bar 6 relative to the accommodation member 2 inside the accommodation member 2. The movement restriction unit 205 faces a portion to which the insertion force of the electronic component, which is not illustrated, is applied on the bus bar 6 located in the same direction, as well as a portion holding the bus bar 6, in a direction intersecting the same direction and in a state being separated from the bus bar 6. The movement restriction unit 205 in the present embodiment faces the fork terminal unit 62 and the bus bar holding unit 26 formed in the longitudinal direction, in the width direction being the orthogonal direction. The movement restriction unit 205 also faces the second rectangular unit 61 in the longitudinal direction. The movement restriction unit 205 is provided between the second rectangular unit 61 and the first wall 202, and protrudes from the wall surface that faces the second rectangular unit 61 of the first wall 202, toward the second rectangular unit 61. In the vertical direction, the movement restriction unit 205 is formed on the lower side end of the first wall 202 that faces at least the lower side end of the second wall surface 61b of the second rectangular unit 61, in the longitudinal direction. In this example, when the bus bar 6, which will be described below, rotates around the bus bar holding unit 26 in the counterclockwise direction, the movement restriction unit 205 is designed so as to come into contact with the second rectangular unit 61, before the first rectangular unit 60 comes into contact with the upper side end of slit 25a.

Next, an action of the bus bar 6 when the electronic component, which is not illustrated, is inserted into the fork terminal unit 62 will be described. As illustrated in FIG. 6, when the electronic component is inserted downward into the fork terminal unit 62, the insertion force in a downward direction C1 is applied to the fork terminal unit 62. During the process, the external force is applied to the bus bar 6 in the downward direction C1 due to the insertion force, and the bus bar holding unit 26 comes into contact with the bus bar 6. When viewed from the width direction, the fork terminal unit 62 to which the insertion force in the downward direction C1 is applied and the bus bar holding unit 26 that holds the bus bar 6 from the downward direction are separated. Thus, the bus bar holding unit 26 functions as a fulcrum, and when viewed from the width direction, the rotation force to rotate the bus bar 6 around the bus bar holding unit 26 is applied. Hence, when viewed from the longitudinal direction, the portion of the first rectangular unit 60 that is placed at the second rectangular unit 61 side than the bus bar holding unit 26 as well as the second rectangular unit 61 try to rotate in counterclockwise directions C2 and C3.

The distance between the second rectangular unit 61 and the bus bar holding unit 26 is the longest, and changes largely. Thus, the lower side end of the second rectangular unit 61 tries to start moving in the direction opposite from the fork terminal unit 62 side in the upward direction as well as the longitudinal direction. However, because the lower side end of the second rectangular unit 61 faces the movement restriction unit 205 in the longitudinal direction, the second rectangular unit 61 comes into contact with the movement restriction unit 205. Hence, the rotation of the bus bar 6 around the bus bar holding unit 26 in the counterclockwise direction is suppressed. In other words, it is possible to prevent the insertion force in the downward direction C1 from being used for rotating the bus bar 6 around the bus bar holding unit 26 in the counterclockwise direction. Consequently, it is possible to prevent the insertion force that is generated when the electronic component, which is not illustrated, is inserted into the fork terminal unit 62 from being increased. In this manner, it is possible to prevent the bus bar 6 from deforming, that occurs when the electronic component 5 is inserted into the bus bar 6, and improve the connection reliability between the electronic component 5 and the bus bar 6.

In the second embodiment described above, in the holding state, the second rectangular unit 61 and the movement restriction unit 205 are separated. However, the second rectangular unit 61 and the movement restriction unit 205 may be provided so as to come into contact with each other. In addition, the movement restriction unit 205 may be formed on the second wall 203. In this case, in the vertical direction, the movement restriction unit 205 is to be formed on the upper side end of the second wall 203 that faces at least the upper side end of the first wall surface 61a of the second rectangular unit 61 in the longitudinal direction. Furthermore, the movement restriction unit 205 may be formed on both the first wall 202 and the second wall 203. In this case, when viewed from the width direction, the two movement restriction units 205 can interpose the second rectangular unit 61 in the vertical direction as well as the longitudinal direction, in a diagonal manner. Thus, the rotation of the bus bar 6 around the bus bar holding unit 26 in the counterclockwise direction can be further suppressed, thereby further suppressing the bus bar 6 from deforming. As a result, it is possible to further improve the connection reliability between the bus bar 6 and the electronic component 5.

The electronic component unit and the electrical connection box according to the present embodiments can electrically connect each of the electronic components that is accommodated in each of the divided space portions and the rectangular unit of the bus bar, because the slit into which the rectangular unit of the bus bar is to be inserted is provided on the dividing wall that is interposed between the adjacent divided space portions in the accommodation member, thereby enabling the exposure of the rectangular unit to the inside of the divided space portions. Consequently, it is possible to electrically connect the bus bar and each of the electronic components in each of the divided space portions, and simplify the external shape of the bus bar.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic component unit comprising:
an accommodation member that includes a first opening and a second opening for communicating an accommodation space portion;
a plurality of electronic components that are accommodated in the accommodation space portion by being inserted into the accommodation space portion from the second opening; and
a bus bar in a planar shape that is accommodated in the accommodation space portion by being inserted into the accommodation space portion from the first opening, and that includes a rectangular unit, wherein
the accommodation member includes a dividing wall that couples inner wall surfaces facing each other in a peripheral wall for forming the accommodation space portion, in the accommodation space portion, and that forms divided space portions by dividing the accommodation space portion,
the dividing wall is provided with a slit that extends from an end of the first opening side toward the second opening, and that communicates the adjacent divided space portions,
the rectangular unit of the bus bar is exposed to inside of each of the divided space portions, when the rectangular unit is held by being inserted into the slit, and
the electronic components are individually accommodated in the respective divided space portions, and are connected to the rectangular unit being exposed.

2. An electrical connection box comprising:
a housing; and
an electronic component unit that is accommodated in a housing inner space portion of the housing, wherein
the electronic component unit includes
an accommodation member having a first opening and a second opening that communicate an accommodation space portion of the electronic component unit,
a plurality of electronic components that are accommodated in the accommodation space portion by being inserted into the accommodation space portion from the second opening, and
a bus bar in a planar shape that is accommodated in the accommodation space portion by being inserted into the accommodation space portion from the first opening, and that includes a rectangular unit,
the accommodation member includes a dividing wall that couples inner wall surfaces facing each other in a peripheral wall for forming the accommodation space portion, in the accommodation space portion, and that forms divided space portions by dividing the accommodation space portion,
the dividing wall is provided with a slit that extends from an end of the first opening side toward the second opening, and that communicates the adjacent divided space portions, the rectangular unit of the bus bar is exposed to inside of each of the divided space portions, when the rectangular unit is held by being inserted into the slit, and the electronic components are individually accommodated in the respective divided space portions, and are connected to the rectangular unit being exposed.

* * * * *